(12) United States Patent
Cabodi et al.

(10) Patent No.: US 11,878,933 B2
(45) Date of Patent: Jan. 23, 2024

(54) PROTECTIVE LAYER FOR A REFRACTORY PRODUCT

(71) Applicant: SAINT-GOBAIN CENTRE DE RECHERCHES ET D'ETUDES EUROPEEN, Courbevoie (FR)

(72) Inventors: Isabelle Cabodi, Cavaillon (FR); Frédéric Hoffmann, Cheval-Blanc (FR); Pierrick Fabien Vespa, Aix-en-Provence (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 490 days.

(21) Appl. No.: 17/263,788

(22) PCT Filed: Jul. 26, 2019

(86) PCT No.: PCT/EP2019/070241
§ 371 (c)(1),
(2) Date: Jan. 27, 2021

(87) PCT Pub. No.: WO2020/025496
PCT Pub. Date: Feb. 6, 2020

(65) Prior Publication Data
US 2021/0292211 A1    Sep. 23, 2021

(30) Foreign Application Priority Data
Aug. 1, 2018 (FR) .................................... 1857216

(51) Int. Cl.
*B23K 26/354* (2014.01)
*C03B 5/43* (2006.01)
(Continued)

(52) U.S. Cl.
CPC ............. *C03B 5/43* (2013.01); *B23K 10/00* (2013.01); *B23K 26/354* (2015.10); *C03B 5/23* (2013.01);
(Continued)

(58) Field of Classification Search
CPC .. B23K 10/00; B23K 26/354; B23K 2101/35; B23K 2103/54; C03B 5/23; C03B 32/02; C03C 3/062
See application file for complete search history.

(56) References Cited

U.S. PATENT DOCUMENTS 4,748,307 A * 5/1988 Lamb ..................... C03C 3/12
428/34.5
2007/0141348 A1 6/2007 Witzmann et al.

FOREIGN PATENT DOCUMENTS

FR        2618705 A1    2/1989
JP     2007-530409 A    11/2007
(Continued)

OTHER PUBLICATIONS

Yilbas et al "Laser Remelting of Zirconia Surface: Investigation into Stress Field and Microstructures" Materials and Manufacturing Processes, 26:10, 1277-1287 (Year: 2011).*
(Continued)

*Primary Examiner* — Nathan H Empie
(74) *Attorney, Agent, or Firm* — Ronald M. Kachmarik; Cooper Legal Group LLC (57) ABSTRACT

A process for treating a fused refractory product including more than 10% by mass of $ZrO_2$, or "base product." The process includes heating at least a portion of the surface of the product, so as to melt $ZrO_2$ crystals in a superficial region extending to a depth of less than 2000 μm. The process includes cooling the molten superficial region obtained in the preceding step so as to obtain a protective layer.

13 Claims, 4 Drawing Sheets (51) Int. Cl.
*B23K 10/00* (2006.01)
*C03B 5/23* (2006.01)
*C03B 32/02* (2006.01)
*C03C 3/062* (2006.01)
*B23K 101/34* (2006.01)
*B23K 103/00* (2006.01)
*F27D 1/00* (2006.01)

(52) U.S. Cl.
CPC .............. *C03B 32/02* (2013.01); *C03C 3/062* (2013.01); *B23K 2101/35* (2018.08); *B23K 2103/54* (2018.08); *F27D 1/0006* (2013.01)

(56) References Cited

FOREIGN PATENT DOCUMENTS

| | | |
|---|---|---|
| JP | 2008-513328 A | 5/2008 |
| WO | 2005/095304 A1 | 10/2005 |
| WO | 2006/032757 A1 | 3/2006 |

OTHER PUBLICATIONS

International Search Report corresponding to International Application No. PCT/EP2019/070241 dated Oct. 14, 2019, 7 pages.
Tiegs, T.N., et al., "Surface Treatment of AZS Refractories Using High-Density Infrared Heating: Kriven/64th Conference", 2004, 64th Conference on Glass Problems: Ceramic Engineering and Science Proceedings, vol. 25, Wiley Online Library—The American Ceramic Society, US, pp. 2-12.
Office Action for Corresponding Japanese Patent Application 2021-504822, dated Sep. 21, 2022, 5 pages.

\* cited by examiner

PROTECTIVE LAYER FOR A REFRACTORY PRODUCT

TECHNICAL FIELD

The invention relates to a fused refractory product, in particular a block, at least partially covered with a protective layer.

The invention also relates to a process for treating the surface of an uncoated refractory product, by irradiation with laser radiation, in order to obtain a product according to the invention.

Finally, the invention relates to a glass furnace, the lining of which comprises at least one block according to the invention.

PRIOR ART

Among the refractory blocks, fused blocks are distinguished, which are well known for the construction of glass or metal smelting furnaces, and sintered blocks.

Unlike sintered blocks, fused blocks usually include an intergranular amorphous phase connecting the crystalline grains. The problems encountered with sintered blocks and fused blocks, and the technical solutions adopted for solving them, are thus generally different. A composition developed for manufacturing a sintered block thus cannot in principle be used as such for manufacturing a fused block, and vice versa.

Fused blocks, often referred to as "electrofused blocks", are obtained by melting a mixture of suitable starting materials in an electric arc furnace or via any other suitable technique. The molten material is then conventionally cast in a mold, and then solidified. Generally, the product obtained then undergoes a controlled cooling cycle to be brought to ambient temperature without fracturing.

The fused blocks used for the refractory lining of a glass furnace may typically include between 10% and 95% of $ZrO_2$.

Blocks with a low or moderate $ZrO_2$ content have good characteristics, but have room for improvement with respect to exudation and corrosion by molten glass or by its vapors.

Fused blocks with a high or very high $ZrO_2$ content (VHZC), generally including more than 80%, or even more than 85% or even more than 90% by mass of $ZrO_2$, are reputed for their very high corrosion resistance and their capacity for not coloring the glass produced, for not generating defects in the glass and for exuding only sparingly. Their resistance to glass vapors still has room for improvement.

US 2007/0141348 describes a refractory product whose surface is exposed to laser irradiation in order to reduce the reactivity of its surface and the blistering on contact with molten glass. However, this treatment does not make it possible to efficiently protect a fused refractory block including more than 10% by mass of $ZrO_2$.

There is thus a need for a fused refractory product including more than 10% by mass of $ZrO_2$ and having better resistance to corrosion by molten glass vapors, and lower exudation.

One aim of the invention is to address this need, at least partially.

SUMMARY OF THE INVENTION

The invention relates to a process for treating a fused refractory product including more than 10% by mass of $ZrO_2$, or "base product", said process including the following steps:

a) heating at least a portion of the surface of said product, or "surface to be treated", so as to melt $ZrO_2$ grains in a superficial region extending to a depth of less than 2000 μm, or "remelting"; and b) cooling the molten superficial region obtained in the preceding step so as to obtain a protective layer;

c) optionally at least partially recrystallizing the zirconia present in the amorphous phase of the protective layer.

Surprisingly, and as shall be seen in greater detail in the continuation of the description, the melting of the $ZrO_2$ grains makes it possible to obtain a very dense and homogeneous protective layer which gives excellent resistance to corrosion by glass vapors and considerably reduces the tendency toward exudation by the treated surface. Without being able to explain it theoretically, the inventors also attribute the results obtained, and in particular the maintenance of noteworthy mechanical properties, and notably the absence of cracks, by the very low thickness (measured in the direction of the depth) of the protective layer.

The adhesion of the protective layer is also noteworthy.

In a noteworthy manner, the results are also obtained for fused base products including more than 80% by mass of $ZrO_2$.

The treatment described in US 2007/0141348 does not include heating permitting remelting.

A process according to the invention may also include one or more of the following optional features:

in step a), the surface to be treated is heated to a temperature above 2500° C., preferably above 2700° C., preferably above 2750° C., preferably above 2800° C., preferably above 2900° C., preferably above 3000° C.;

in step a), the surface to be treated is irradiated using an incident laser or plasma radiation beam, conventionally with a plasma torch;

in step a), the surface to be treated is heated, preferably by laser irradiation, to melt the base product to a depth of greater than 50 μm, preferably greater than 100 μm, and/or preferably less than 1500 μm, preferably less than 1200 μm, less than 1000 μm, preferably less than 700 μm, preferably less than 500 μm;

in step a), the surface to be treated is supplied with exposure energy of greater than 50 J/mm³, preferably greater than 100 J/mm³, the exposure energy being the ratio between the power per unit area of the beam and the travel speed of the incident beam over the surface to be treated;

in step b), the molten superficial region is cooled by exposing it to the open air;

in step b), the cooling rate is greater than 100° C./second, preferably greater than 500° C./second;

the base product is a block, preferably a block with a mass of greater than 1 kg, preferably greater than 5 kg, or even greater than 10 kg;

the surface to be treated represents more than 10%, more than 30%, more than 60%, more than 80% or even 100% of the surface of a face, or even of several faces, or even of all the faces of the base product;

the product has, before step a), a chemical composition such that:
10%<$ZrO_2$<98%; and/or
0.5%<$Al_2O_3$<70%; and/or
1.5%<$SiO_2$<40%;
provided that 90%<$ZrO_2+Al_2O_3+SiO_2$, preferably 95%<$ZrO_2+Al_2O_3+SiO_2$.

Surprisingly, the inventors have also discovered that steps a) and b) make it possible to plug surface imperfections or cracks on the base product.

The invention thus also relates to a process for plugging a cavity, for example a crack, at the surface of a base product, said process including steps a) and b), and optionally c), the surface to be treated including said cavity, or even being specifically determined to include said cavity.

In one embodiment, the surface to be treated does not extend continuously beyond a distance of 10 mm from the edge of said cavity. The cavity is thus treated locally.

The invention also relates to a fused refractory product protected with a protective layer, preferably manufactured according to a process according to the invention, the product including, under the protective layer, more than 10% by mass of $ZrO_2$, the protective layer:
- including more than 10% by mass of $ZrO_2$;
- having a thickness of less than 2000 μm; and
- comprising, for more than 50% by volume, or even consisting substantially of an amorphous phase and/or zirconia crystallites, the mean surface area of which is less than 5 μm$^2$.

High-temperature melting for a limited time makes it possible to obtain this specific combination of microstructure and of thickness.

A product according to the invention may also include one or more of the following optional features:
- preferably, the mean surface area of the zirconia crystallites is less than 2 μm$^2$, or even less than or equal to 1 μm$^2$;
- preferably, the thickness of the protective layer is less than 1500 μm, or even less than 1000 μm;
- the porosity of the protective layer is less than 10%, preferably less than 5%, preferably less than 3%, preferably less than 2%, preferably less than 1%, the porosity being the percentage of the surface area occupied by pores in a cut plane perpendicular to the surface to be treated. This porosity is preferably measured in a polished section, obtained with a scanning microscope in a cut plane perpendicular to the surface treated.

Definitions

The terms "include", "have" and "comprise" should be interpreted in a broad, nonlimiting manner.

The "hot face" is a face exposed to the interior of the furnace, i.e. in contact with the molten material, for example glass or metal, and/or with the gaseous environment of this material. The cold face is conventionally the face opposite the hot face. The hot and cold faces of a block are connected together
- via side faces, or "joint faces" facing the side faces of adjacent blocks in the same row of blocks, and
- via upper and lower faces, facing the lower and upper faces of at least one upper block resting on said block and of at least one lower block on which said block rests, respectively.

The thickness of a block is conventionally its smallest dimension. It conventionally measures the distance between the hot face, in contact with the atmosphere of the furnace, and the cold opposite face.

The mean surface area of the zirconia crystallites is the arithmetic mean of the surface areas measured for each crystallite in a cut plane perpendicular to the surface treated. Preferably, images of the cut plane are acquired using a scanning microscope, and are then analyzed. The area over which the crystallite surface areas is measured is preferably greater than 100 μm$^2$, preferably greater than 500 μm$^2$, preferably greater than 1000 μm$^2$. The magnification is conventionally adapted to the size of the crystallites to be measured. For example, a magnification of 5000 to 10 000 makes it possible to measure crystallite surface areas typically between 0.1 and 5 μm$^2$. A magnification of 10 000 to 25 000 makes it possible to measure crystallite surface areas typically between 0.01 and 0.5 μm$^2$. Conventional image analysis techniques, optionally after binarization of the images to improve their contrast, may be performed.

The porosity is the percentage of the surface area occupied by pores in a cut plane perpendicular to the surface to be treated. The perpendicular cross-section cut plane is arbitrary. Preferably, the cut plane images used for measuring the surface area occupied by the pores are acquired using a scanning electron microscope. A person skilled in the art knows that the surface area of the images used must be sufficient for the measurements to be significant. Preferably, the area of the protective layer on an image represents a surface area of greater than 100 μm$^2$, preferably greater than 500 μm$^2$, preferably greater than 1000 μm$^2$ in order to obtain a representative surface area.

More preferably, the cut plane images used represent the entire thickness of the protective layer.

The surface area occupied by the pores may be measured via conventional image analysis techniques that are well known to those skilled in the art, optionally after binarization of the image in order to increase its contrast. The porosity is the percentage ratio of the sum of the surface areas of pores to the surface area of the protective layer represented in the image.

The equivalent diameter of the cross section of a beam is the diameter of a disc having the same area as this cross section.

The term "grain" refers to a crystalline element, having a homogeneous composition or a eutectic composition, and having a size of greater than 10 μm.

The term "crystallite" refers to a crystalline element with a surface area of greater than 0.1 μm$^2$ and less than 10 μm$^2$, the surface areas being measured on an image taken by light microscopy on a section of the product.

The term "grain size" means the half-sum of the overall length and of the overall width of a grain, the length and the width being measured on an image taken by light microscopy on a section of the product, the width being measured in a direction perpendicular to said length.

The term "mean" means an arithmetic mean.

The term "$ZrO_2$ grains" means a grain including more than 80%, preferably more than 90%, preferably more than 95%, preferably more than 98% of $ZrO_2$ as mass percentages on the basis of the oxides.

Unless otherwise indicated, all the percentages relating to the compositions are mass percentages on the basis of the oxides.

BRIEF DESCRIPTION OF THE FIGURES

Other features and advantages of the invention will emerge more clearly on reading the following detailed description and on examining the appended drawing, in which:

FIGS. 3 to 5 show cracks. They are due to the polishing during the preparation of the polished section.

DETAILED DESCRIPTION

Manufacturing Process

In step a), a fused refractory product including more than 10% by mass of $ZrO_2$, or "base product", is treated.

The base product is a dense fused product, i.e. a product with a total porosity of less than 10% by volume, the total porosity being given by the following relationship:

Total porosity=100×(absolute density−apparent density)/absolute density

The apparent density is measured according to the standard ISO 5017 on a bar taken from the core of the product, in a healthy zone. The absolute density is measured on ground powder using a helium pycnometer.

The base product is conventionally obtained by melting a feedstock composed of refractory grains, casting of the liquid bath thus obtained in a mold, and then cooling to solidify the liquid mass. Preferably, the base product is obtained by electrofusion.

The base product is conventionally a fused refractory block.

Preferably, this refractory block has a maximum thickness of greater than 50 mm, or even greater than 100 mm. In a noteworthy manner, the treatment process according to the invention does not lead to the appearance of macrocracks on the surface of such blocks.

The block may be chosen in particular from the group consisting of plate blocks, burner arches, tank blocks, but also the superstructure parts of a glass furnace.

The surface to be treated is preferably a part or all of the hot face of the block, i.e. the surface in contact with molten glass and/or with the gases extending above the molten glass. In one embodiment, the surface to be treated comprises the entire exterior surface of the block.

The base product conventionally includes an intergranular binder phase, connecting the crystalline grains.

The crystalline grains include $ZrO_2$ grains and, optionally, corundum-zirconia eutectic mixtures.

The zirconium in the base product is mainly present in the form of grains. These monocrystalline or polycrystalline grains preferably consist of $ZrO_2$ for more than 95%, more than 98%, more than 99% or substantially 100% of their mass.

The mean grain size is preferably greater than 10 μm, preferably greater than 20 μm, preferably greater than or equal to 30 μm and/or less than 200 μm, preferably less than 100 μm.

The base product preferably consists, for more than 90% of its mass, of one or more oxides chosen from the group consisting of $ZrO_2$, $Al_2O_3$, $SiO_2$, $Cr_2O_3$, $Y_2O_3$ and $CeO_2$. Preferably, $ZrO_2$, $Al_2O_3$ and $SiO_2$ together represent more than 90% of the mass of the base product.

The base product preferably includes more than 15% of $ZrO_2$, and more preferably includes between 26% and 95% of $ZrO_2$.

In various preferred embodiments, the composition of the base product is such that, for a total of more than 90%, more than 95%, or even more than 98%:
    $ZrO_2$: 26 to 45%;
    $Al_2O_3$: 40 to 60%;
    $SiO_2$: 5 to 35%;
or such that
    $ZrO_2$: 50 to less than 80%;
    $Al_2O_3$: 15 to 30%;
    $SiO_2$: 5 to 15%;
or such that
    $ZrO_2$: 80 to 98%;
    $Al_2O_3$: 5 to 20%;
    $SiO_2$: 1 to 12%;
or such that
    $10\% < ZrO_2 \leq 25\%$;
    $50\% < Al_2O_3 < 75\%$;
    $5\% < SiO_2 < 35\%$.

The binder phase includes, and preferably consists of, one or more amorphous or vitroceramic phases, preferably a silicate phase. It preferably represents between 5% and 50%, preferably between 10% and 40% by mass of the base product.

Preferably, the phase is a silicate phase, the mass proportion of $Na_2O$ of which is less than 20%, preferably less than 10% and/or the mass proportion of $Al_2O_3$ of which is less than 30%, as a mass percentage on the basis of the oxides of the silicate phase.

Preferably, in particular for all these embodiments, the mass content of $Na_2O$ and $B_2O_3$ is less than 2%, as a mass percentage on the basis of the oxides of the base product.

To create a protective layer on the surface to be treated of the base product, a large amount of energy is concentrated on a small surface area, for a very short period of time.

Preferably, the base product is initially dry, i.e. it has a percentage of moisture of less than or equal to 1%, preferably less than 0.5%, as a mass percentage.

The surface to be treated is then irradiated using an incident beam, of laser or of plasma radiation, so as to transmit to this surface an exposure energy of greater than 50 $J/mm^3$, preferably greater than 75 $J/mm^3$, preferably greater than 100 $J/mm^3$, or even greater than 150 $J/mm^3$ and/or less than 500 $J/mm^3$, 400 $J/mm^3$ or 300 $J/mm^3$.

The exposure energy is the ratio between the power per unit area of the incident beam and the travel speed of the incident beam over the surface to be treated. It is adapted as a function of the composition of the $ZrO_2$ grains, in order to make them melt. Preferably, the temperature is greater than 2800° C.

The power per unit area is the ratio of the power, in watts, of the incident beam divided by the surface area, in $mm^2$, of the cross section of the incident beam when it meets the surface of the base product, or "impact surface".

The power of the incident beam is preferably greater than 10 W, 20 W, 30 W, 40 W and/or less than 400 W, 300 W, 200 W, 100 W.

The equivalent diameter of the cross section of the incident beam, at the impact surface, is preferably greater than 10 μm, preferably greater than 20 μm, and/or less than 100 μm, preferably less than 80 μm, 60 μm, 50 μm or 40 μm.

The cross section of the incident beam may be of varied shape, for example of circular cross section or of rectangular cross section ("in-line" laser beam). A rectangular cross section advantageously allows faster treatment of a large surface area. Preferably, the direction of travel of the incident beam is perpendicular to the long side of the rectangular cross section.

Preferably, the smaller dimension (or "width") of the cross section of the incident beam on the impact surface is between 10 and 500 μm, preferably between 10 and 100 μm. A beam travelling along this width, close to that of the $ZrO_2$ grains at the surface of the fused base product, is particularly suitable for obtaining a very dense and homogeneous protective layer.

Preferably, the beam width is adapted as a function of the mean size of the $ZrO_2$ grains present at the surface of the base product. Preferably, the larger the mean grain size, the larger the beam width. Preferably, the beam width is between 0.5 and 2 times the mean size of the $ZrO_2$ grains.

The power per unit area of the incident beam is preferably greater than 5000 $W/mm^2$, preferably greater than 7000 $W/mm^2$, preferably greater than 10 000 $W/mm^2$, or even greater than 15 000 $W/mm^2$, and/or preferably less than 50 000 $W/mm^2$, preferably less than 30 000 $W/mm^2$, or even less than 25 000 $W/mm^2$.

The energy supplied to the impact surface must be supplied in a very short period of time, so as to limit the superficial damage of the base product and, consequently, the remelting depth. The incident beam must thus travel quickly.

The travel speed of the incident beam on the impact surface relative to the surface to be treated, in mm/s, is preferably greater than 20 mm/s, preferably greater than 30 mm/s, greater than 40 mm/s, preferably greater than 50 mm/s, preferably greater than 75 mm/s, and/or less than 500 mm/s, or even less than 300 mm/s, or even less than 100 mm/s.

To treat the surface to be treated, use is preferably made of a laser, preferably of the "$CO_2$" type, with a wavelength of 1065±5 nm, and a mean laser beam power of between 10 and 100 watts, preferably between 20 and 60 W. The laser equipment may comprise a targeting device which aids the positioning of the laser beam. The laser equipment may be, for example, a laser treatment machine sold by Cerlase.

The incident beam is conventionally obtained by focusing a primary beam.

Preferably, the equivalent diameter of the primary beam is less than 1000 micrometers.

The focal distance has an impact on the shape and size of the incident beam. In general, the shorter the focal distance, the higher the power per unit area.

The focal distance is preferably between 50 and 500 mm, preferably between 60 and 400 mm, more preferably between 70 and 300 mm. It is preferably between 150 mm and 200 mm. Advantageously, the homogeneity of the treatment, and thus of the protective layer, is thereby improved.

Moreover, such a focal distance is advantageously compatible with the laser beam widths described above, and in particular with a width of between 10 and 100 μm.

It is possible to use a pulsed laser to heat the surface to be treated, which makes it possible to obtain very high powers during the pulses (power peaks). However, such a laser only emits intermittently.

Preferably, the laser used is not pulsed or is a pulsed laser whose pulse frequency is greater than 300 kHz.

Vectorization conventionally represents the edge-to-edge distance between two adjacent lines treated with the incident beam, in microns. If the vectorization is too high or too low, the melting will be less homogeneous. The vectorization is preferably between 0.2 and 2 times, preferably between 0.5 and 1.5 times the beam width, preferably between 20 and 80 microns, preferably between 30 and 50 microns.

Preferably, the incident beam passes at most once over a zone of the surface to be treated.

In step b), the superficial region of the molten base product is cooled rapidly to be transformed into the protective layer.

With a laser treatment, exposure to the ambient atmosphere suffices to obtain quenching suitable to obtain a protective layer.

Additional cooling means, for example for blowing air at ambient temperature or at a lower temperature, may also be used.

In step c), the protective layer may be retreated thermally, preferably by heating,
preferably in air,
preferably at a temperature above 1000° C., preferably above 1300° C., preferably above 1400° C., preferably above 1500° C.,
preferably for a time of greater than 10 hours, preferably greater than 15 hours, preferably greater than 20 hours,
the temperature increase rate preferably being greater than 5° C./hour, 10° C./hour, and/or preferably less than 80° C./hour, preferably less than 50° C./hour, preferably less than 30° C./hour,
the temperature decrease rate preferably being greater than 5° C./hour, 10° C./hour, and/or preferably less than 80° C./hour, preferably less than 50° C./hour, preferably less than 30° C./hour.

Step c) is preferably performed in air, with a temperature increase rate of 10° C./hour up to 1500° C., a stage of 24 hours at this temperature, followed by a controlled reduction at 50° C./hour.

Figure 8A:
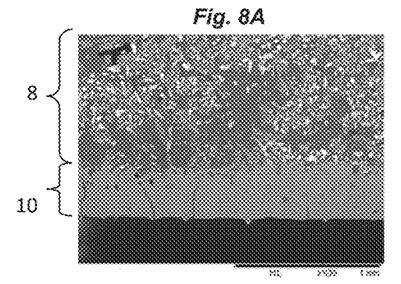
FIGS. 8A to 8C show a cross section of a block ER1681, and more precisely the structure of an amorphous phase of the protective layer before (FIG. 8A) and after annealing (FIGS. 8B and 8C), FIG. 8C showing, by means of a high magnification, the appearance of new zirconia microcrystals in the protective layer of the annealed block.
Figure 8B:
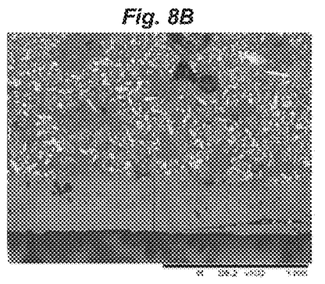

The $ZrO_2$ of the amorphous phase can thus recrystallize in the form of zirconia crystallites as shown in FIGS. 8A and 8B. These crystallites preferably have a mean surface area of less than 5 $μm^2$, 3 $μm^2$, 2 $μm^2$, or even less than 1 $μm^2$, and/or greater than 0.1 $μm^2$, 0.2 $μm^2$ or 0.5 $μm^2$.

Treated Product

The product resulting from the process is referred to as the "treated product". It consists of a substrate and of the protective layer, which extends at the surface of the substrate.

The substrate is not substantially modified by the process for manufacturing the protective layer. The features relating to the base product are thus applicable to the substrate.

The mean thickness of the protective layer depends on the nature of the base product and on the parameters of exposure to the high-energy beam, notably the power per unit area and the relative travel speed of the beam with respect to the base product. The mean thickness of the protective layer is preferably between 50 and 2000 μm, preferably between 100 and 1000 µm, more preferably between 100 and 700 µm, or even between 100 and 500 µm. It is preferably greater than 200 µm.

The protective layer has a composition substantially similar to that of the substrate, and thus of the base product. The features relating to the composition of the base product are thus applicable to the protective layer. In particular, the protective layer preferably includes the elements Zr, Al, Si and O.

Preferably, however, the protective layer has a mass content of elements Na and/or Si lower than that of the substrate. These elements may in point of fact be volatilized during step a).

In particular, the mass ratio of the $SiO_2$ content in the protective layer to the $SiO_2$ content in the substrate is preferably less than 1.0, preferably less than 0.9, or even less than 0.8, and/or preferably greater than 0.1, preferably greater than 0.3, preferably greater than 0.5.

The volatilization of the elements Na and/or Si during step a) leads to a relative increase in the other elements. In particular, the mass ratio of the $ZrO_2$ content in the protective layer to the $ZrO_2$ content in the substrate is preferably greater than 1.0, preferably greater than 1.1, or even greater than 1.2, and/or preferably less than 2.0, preferably less than 1.8, more preferably less than 1.6.

The protective layer may be totally amorphous. It may also contain a few zirconia crystallites dispersed in an amorphous binder phase. Finally, it may consist substantially of zirconia crystallites, the zirconia crystallites being virtually contiguous to the point of forming a substantially continuous phase, in particular when the base product has a chemical composition comprising more than 80% or even more than 90% by mass of $ZrO_2$.

Preferably, the protective layer consists, for more than 50%, more than 70%, more than 80% or even more than 90% by volume, of an amorphous dense phase and/or of zirconia crystallites.

In the protective layer, the zirconia crystallites are preferably monocrystals, i.e. crystallites having the same structure as a zirconia monocrystal.

Preferably, the mean surface area of the zirconia crystallites is greater than 0.2 µm², or even greater than 0.5 µm², and/or preferably less than 5 µm², preferably less than 3 µm², preferably less than 2 µm², preferably less than 1.0 µm².

The protective layer may also include crystallites including $Al_2O_3$, or even corundum.

Preferably, the protective layer consists, for more than 50%, more than 70%, more than 80% or even more than 90%, or even substantially 100% by volume, of an amorphous dense phase and/or of zirconia crystallites and/or of crystallites including $Al_2O_3$.

Preferably, the protective layer includes, as a volume percentage, more than 80%, more than 90%, more than 95% or even substantially 100% of amorphous phase and of zirconia crystallites. This percentage may in particular be evaluated by image processing and observation by SEM/EDX.

Figure 1:
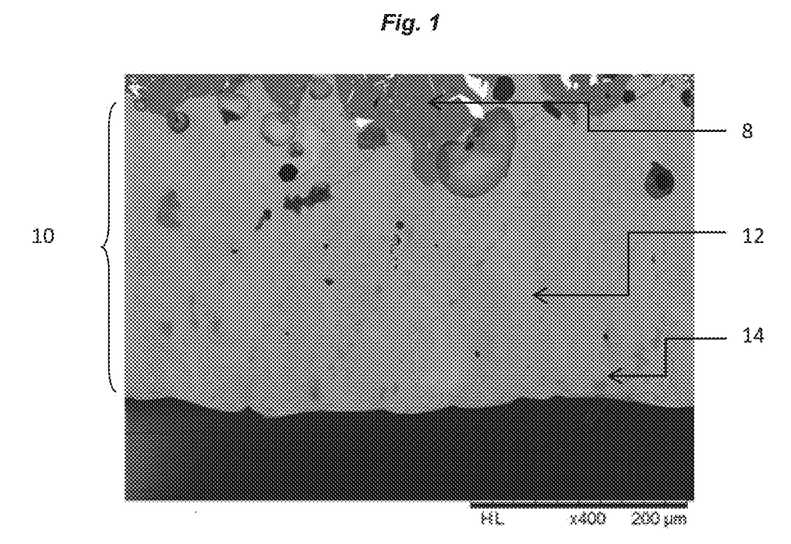
FIG. 1 shows the cross section, on a cut plane perpendicular to the surface treated, of a block according to the invention, treated by laser irradiation.

FIG. 1 shows, on the surface of a substrate 8, the presence of a protective layer 10 comprising zirconia in the form of an amorphous phase AZS 12 and a few seeds of zirconia crystallites 14. Zirconia crystallites 14 are also visible in FIGS. 6 and 7.

Figure 2A:
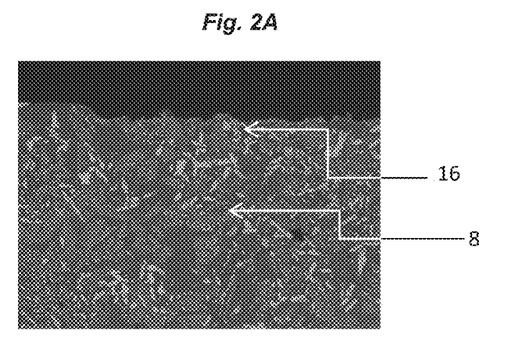
FIG. 2A shows the structure of a block according to comparative example 1 and FIG. 2B shows a detail of this structure showing nonfused $ZrO_2$ grains.

FIG. 2A illustrates the superficial attack of the base product and FIG. 2A in particular shows the presence at the surface of $ZrO_2$ grains 16 which have not fused.

Figure 3:
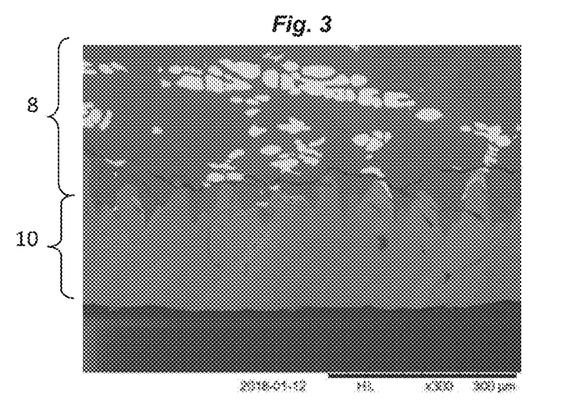
FIGS. 3 to 5 show other blocks according to the present invention with a different $ZrO_2$ content, the protective layer also being formed by laser irradiation.
Figure 4:
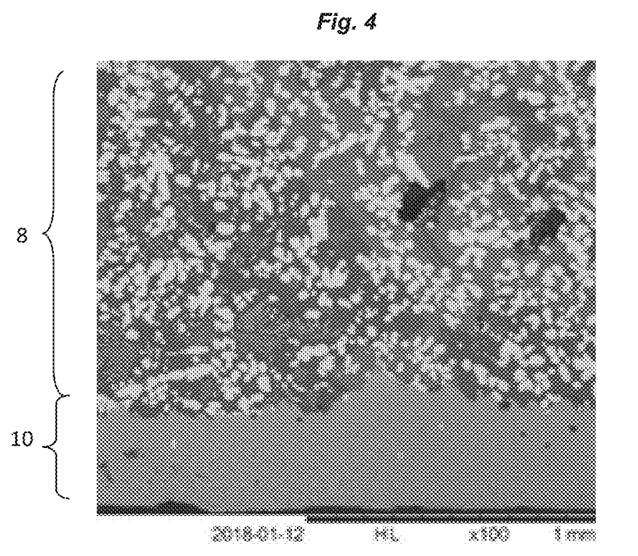
Figure 5:
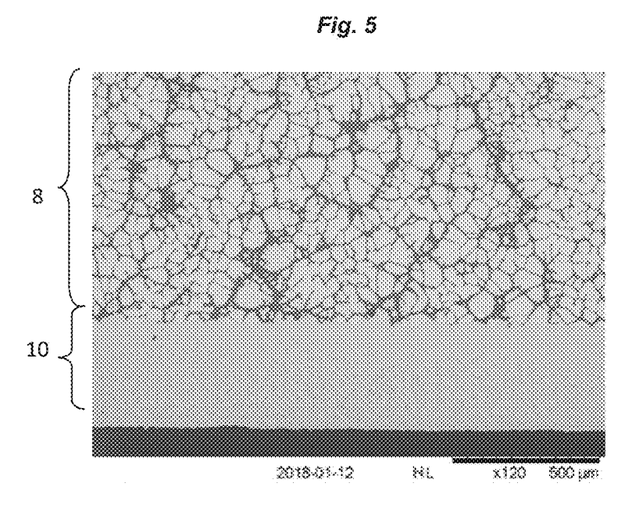

FIGS. 3 to 5 show cracks. They are due to the polishing during the preparation of the polished section.

EXAMPLES

The examples that follow are provided for illustrative purposes and do not limit the invention.

Base products in the form of base blocks 500 mm×500 mm×500 mm in size were manufactured via a process of melting starting materials in an arc furnace, followed by casting in a mold and solidification. The dry, dust-free base blocks were then subjected to a laser beam of a Cerlase processing machine of "unimodal Yb/$CO_2$ fiber" type, except for comparative example 2, for which a laser of "YAG fiber Yb-YAG" type was used, with a wavelength of 1064 nm, the power of which may range from 10 to 100 W and the focal distance of which was adjusted so as to obtain a homogeneous protective layer.

The treatment was performed in air, at atmospheric pressure, the vectorization being 40 µm, with a single pass. The functioning of the laser was managed by a control unit directly connected to the fiber laser. The blocks obtained were then observed.

Table 1 shows the various laser exposure parameters, and the measurement and observation results on the blocks after exposure to the laser beam radiation.

Observation of the Blocks

Example 1 according to the invention shows the presence of a dense protective layer (FIG. 1).

Analysis with a microprobe and with an electron backscatter diffraction (EBSD) scanning electron microscope of the protective layer reveals the absence of Kikuchi figures and thus the presence of a virtually pure AZS amorphous phase $Al_2O_3$—$ZrO_2$—$SiO_2$ ($Al_2O_3$: 50-51%, $ZrO_2$: 39-41%, $SiO_2$: 10-11%, mass percentages). The protective layer thus has a higher $ZrO_2$ content than the base block (and thus than the substrate) and a significantly lower $SiO_2$ content.

The presence of a few seeds of recrystallized zirconia in the form of crystallites with a surface area of less than 0.01 µm² is also observed.

Figure 8C:
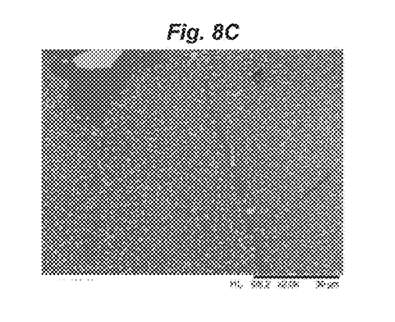

A laser-treated block according to example 1 is then annealed in air (step c)) with a temperature increase rate of 10° C./hour up to 1500° C., a stage of 24 hours at this temperature, followed by a controlled temperature reduction at 10° C./hour. It then has a dense amorphous protective layer containing zirconia crystallites with a mean surface area of 0.68 µm², as shown in FIGS. 8A to C.

Comparative example 1 shows that a base block of composition identical to that of example 1 according to the invention, subjected to irradiation under parameters close to those of US 2007/0141348, does not have a dense and homogeneous zirconia protective layer, even with a low laser travel speed and a high power per unit area.

Figure 2B:
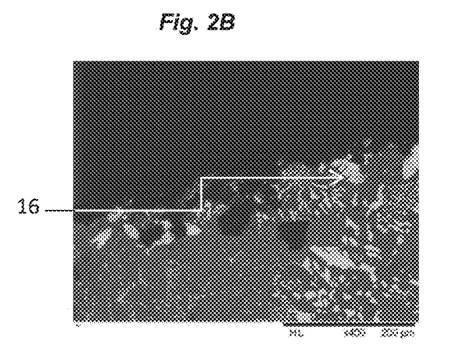

Comparative example 2 performed so as to achieve an exposure energy of the order of 5 J/mm³, similar to that described in US 2007/0141348, leads to local melting of the amorphous phase of the block without melting of the $ZrO_2$ grains (see FIG. 2A and, viewed at a higher magnification, FIG. 2B). This example confirms the impossibility of obtaining a protective layer according to the invention with such an exposure energy on a fused base product.

Examples 2 to 4 show that it is also possible to obtain a dense and perfectly adherent protective layer by laser irradiation of blocks having very different $ZrO_2$ contents, of up to almost 95% by mass of $ZrO_2$. The composition of the protective layer is close to that of the substrate, with, however, a higher $ZrO_2$ content and a lower silica content than in said substrate.

Tests

The following exudation and corrosion tests were performed.

Test 1 of Corrosion by Glass Vapors

Two series of cylindrical specimens 60 mm in diameter and 40 mm long were taken from a base block, i.e. a block not laser-treated, of example 1.

A base surface (discoid) of each cylindrical specimen of the first series was exposed to the laser radiation as defined previously. The specimens of the second series (control series) were not treated, and were stored as controls. Each of the specimens of the two series was then subjected to a corrosion test with sodium sulfate. More specifically, each of the specimens was sealed with aluminous cement to a platinum crucible 50 mm in diameter containing about 60 g of sodium sulfate, in a position in which the treated base surface (for the specimens of the first series) or untreated base surface (for the specimens of the second series) was above and facing the sodium sulfate bath, so as to close off the crucible. These assemblies were placed in a furnace at a temperature of 1500° C. for 100 hours.

The mean thickness of penetration of the sodium hydroxide was then measured, by analysis with an electronic microprobe. Table 1 gives the percentage of reduction of the depth of penetration of a specimen of the laser-treated first series to that of the control specimen according to the following calculation:

reduction of penetration with sodium hydroxide vapor=100×(depth of penetration for second control series−depth of penetration for first laser-treated series)/(depth of penetration for second control series)

Exudation Test 2

Two series of cylindrical specimens 24 mm in diameter and 100 mm long were taken from a base block, i.e. a block not laser-treated, of example 1.

The lower base surface and partially the periphery of the specimens of the first series were exposed to laser radiation. For the periphery, only ⅔ of the height of each specimen, starting from its lower base, were thus treated.

The specimens of the second series (control series) were not treated, and were stored as controls. Each of the specimens of the two series was then placed in a furnace, suspended by a key above a platinum crucible to collect the exudate.

The heat treatment was performed in the furnace, via two successive cycles. Each cycle was composed of a temperature rise up to 1550° C., maintenance at this temperature for 6 hours in air, followed by cooling down to the ambient temperature. The volume percentage exuded relative to the initial volume of the specimen was then calculated, for each specimen. Table 1 gives the percentage of exudate reduction:

Reduction of exudate=100×(vol % exuded sample control series−vol % exuded sample first series)/(vol % exuded control series).

Test 3 of Corrosion by Molten Glass

Two series of cylindrical specimens 20 mm in diameter and 100 mm long were taken from a base block, i.e. a block not laser-treated, of example 4.

The lower base surface and partially the periphery of the specimens of the first series were exposed to laser radiation. For the periphery, only ⅔ of the height of each specimen, starting from its lower base, were thus treated.

The specimens of the second series (control series) were not treated, and were stored as controls. Each of the specimens of the two series was then subjected to a test consisting in rotating the samples immersed in a bath of soda-lime glass maintained at 1500° C. The rotation speed around the axis of the sample holder was 6 rpm. Such a speed makes it possible to very frequently renew the corrosion interface and thus makes the test much more stressing. The test lasted for 48 hours.

At the end of this period, for each sample, the remaining volume of the sample was evaluated and then, by difference with the initial volume of this sample, the volume lost during the test was evaluated. The percentage of volume lost was then calculated by determining the ratio of the volume lost to the initial volume.

Table 1 gives the gain in corrosion resistance calculated as follows:

gain in corrosion resistance=100×(vol % lost sample control series−vol % lost sample first series)/(vol % lost control series)

This percentage change measures the improvement of the corrosion resistance of a laser-treated specimen relative to a specimen that is not laser-treated.

TABLE 1

| Examples | No. 1* | No. 2* | No. 1 | No. 2 | No. 3 | No. 4 |
|---|---|---|---|---|---|---|
| Composition of the fused base blocks | | | | | | |
| $ZrO_2$, mass % | 32 | 32 | 32 | 18 | 41 | 95 |
| $Al_2O_3$, mass % | 51 | 51 | 51 | 68 | 47 | 1 |
| $SiO_2$, mass % | 15 | 15 | 15 | 13 | 12 | 4 |
| Surface treatment | | | | | | |
| Beam power, in W | 10 | 30 | 50 | 50 | 50 | 50 |
| Focal distance, in mm | 230 | 330 | 163 | 163 | 163 | 163 |
| Beam diameter, in μm | 51 | 51 | 56 | 56 | 56 | 56 |
| Beam power per unit area (P), in $W/mm^2$ | 5000 | 15 000 | 20 000 | 20 000 | 20 000 | 20 000 |
| Travel speed (V), in mm/s | 120 | 3000 | 84 | 84 | 84 | 84 |
| Exposure energy (P/V), in $J/mm^3$ | 42 | 5 | 238 | 238 | 238 | 238 |

TABLE 1-continued

Figure 6:
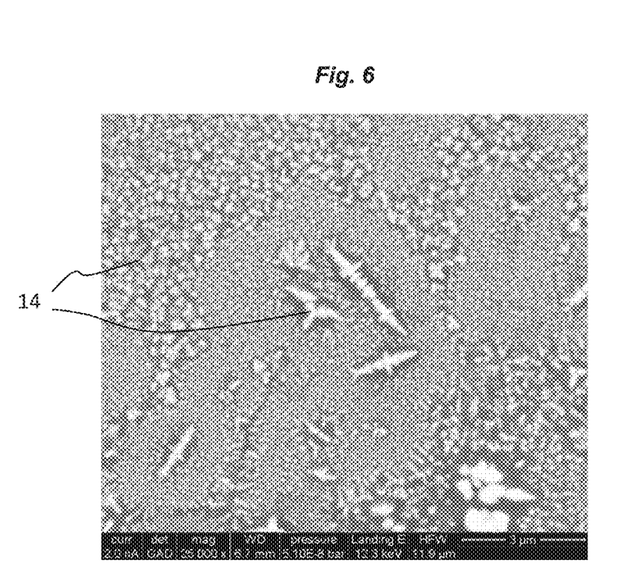
FIGS. 6 and 7 show, with a greater magnification, the structure of the zirconia crystallites present in the protective layer of the blocks according to FIGS. 4 and 5 of the present invention, respectively.
Figure 7:
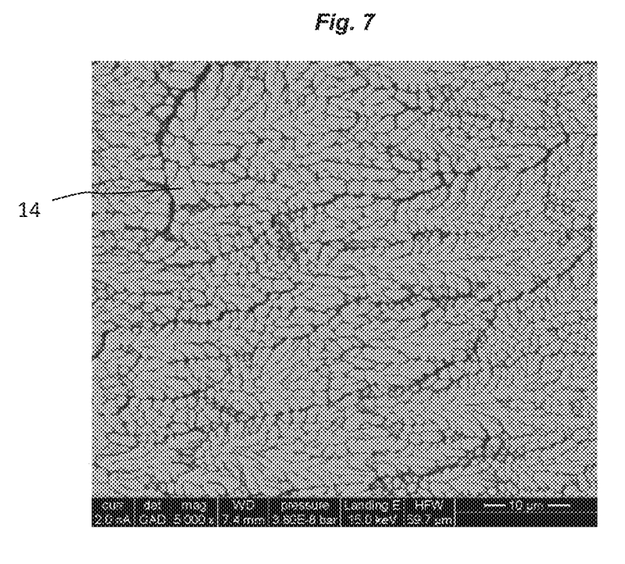

| | | | Product obtained | | |
|---|---|---|---|---|---|
| Photograph | | FIG. 2 | FIG. 1 | FIGS. 4 and 6 | FIG. 3 | FIGS. 5 and 7 |
| Mean surface area of crystallites, in µm² | NA | Zirconia grains not remelted | <0.01 | 0.04 | 0.21 | 1.82 |
| Mean thickness of the protective layer, in µm | NA | <100 | 400 ± 100 | 300 ± 100 | 400 ± 100 | 350 ± 100 |
| Test 1: % reduction in penetration of sodium hydroxide vapor | 0% | no advantage | 40% | not tested | not tested | not tested |
| Test 2: % reduction of exudate | 0% | no advantage | 37% | not tested | not tested | not tested |
| Test 3: gain in resistance to corrosion by fused soda-lime glass, in % | no advantage | no advantage | not tested | not tested | 10% |

| | annealed product |
|---|---|
| Photograph | FIGS. 8B-8C |
| Mean surface area of crystallites, in µm², after annealing | 0.68 |

*comparative example

Table 1 shows a significant improvement of the blocks according to the invention relative to the comparative blocks of the same composition.

The test of corrosion on contact with the molten glass performed for example 4 shows that it is even possible to increase the performance of the block with a very high content of $ZrO_2$.

As is now clearly apparent, the invention makes it possible to protect fused refractory products including more than 10% by mass of $ZrO_2$ in order to give them better resistance to corrosion by molten glass vapors, and lower exudation.

Needless to say, the invention is not limited to the embodiments described in detail and shown in the figures, provided for illustrative purposes.

Surprisingly, the inventors also discovered that steps a) and b) make it possible to plug cavities at the surface of a base product, and notably cracks or craters which may be sites of preferential corrosion.

Figure 9A:
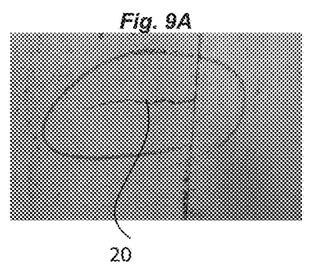
FIGS. 9A to 9C show the appearance of a fused refractory block with a crack before treatment (FIG. 9A) and after exposure to a laser beam on various discoid surfaces (FIGS. 9B and 9C), FIG. 9C showing, by means of a high magnification, the plugging of the crack 20.

In one embodiment, the surface to be treated does not extend continuously, i.e. in an uninterrupted manner, beyond a distance of 10 mm, 5 mm or 3 mm from the edge of said cavity. In FIG. 9A, the cavity is in the form of a crack 20.

Figure 9B:
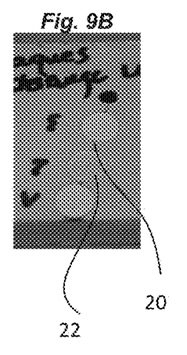
Figure 9C:
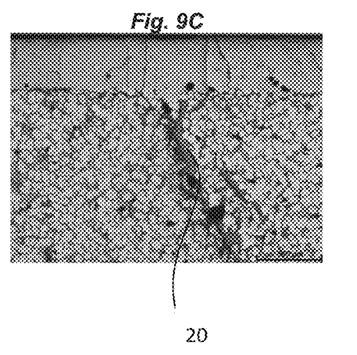

FIG. 9B shows three discoid surfaces to be treated 22, which extends along the crack 20.

In one embodiment, the cavity is substantially a center of the surface to be treated.

In one embodiment,
the length of the cavity is at least 1 cm or is 10% greater than the length of the base block; and/or
the depth of the cavity is preferably less than 1 cm; and/or
the width of the cavity is greater than 100 µm and/or less than 1000 µm;
the length and the width of a cavity being those of its aperture on the surface to be treated.

As shown in FIGS. 9A and 9B, the cavity is plugged with a material identical to that of the protective layer. This material may thus include one or more of the features of this protective layer.

Advantageously, the plugging does not create any additional defects. The invention thus allows local healing of the base product.

The invention claimed is:

1. A process for treating a fused refractory product including more than 10% by mass of $ZrO_2$, or "base product", said process including the following steps:
   a) heating at least a portion of the surface of said product, or "surface to be treated", so as to melt $ZrO_2$ crystals in a superficial region extending to a depth of less than 2000 µm, or "remelting"; and
   b) cooling the molten superficial region obtained in the preceding step so as to obtain a protective layer;
   c) optionally at least partially recrystallizing the zirconia present in the amorphous phase of the protective layer;
   in which process, in step a), the surface to be treated is irradiated using an incident laser or plasma radiation beam, the power per unit area of the incident beam being greater than 5000 W/mm².

2. The process as claimed in claim 1, in which, in step a), the surface to be treated is heated to a temperature above 2500° C.

3. The process as claimed in claim 1, in which, in step a), the surface to be treated is heated to melt the base product over a depth of less than 1000 µm.

4. The process as claimed in claim 1, in which, in step a), the surface to be treated is heated to melt the base product over a depth of greater than 50 µm.

5. The process as claimed in claim 1, in which, in step b), the molten region is cooled by exposing it to the open air.

6. The process as claimed in claim 1, in which, in step b), the rate of cooling of the molten region is greater than 100° C./second.

7. The process as claimed in claim 1, in which, in step a), the surface to be treated is supplied with exposure energy of greater than 50 J/mm³, the exposure energy being the ratio between the power per unit area of the beam and the travel speed of the incident beam over the surface to be treated.

8. The process as claimed in claim 7, in which, in step a), the surface to be treated is supplied with an exposure energy of greater than 100 J/mm³.

9. The process as claimed in claim 1, in which the surface to be treated represents more than 10% of the surface of the base product.

10. The process as claimed in claim 1, in which the base product has a composition
10%<$ZrO_2$<98%; and/or
0.5%<$Al_2O_3$<70%; and/or
1.5%<$SiO_2$<40%;
provided that 90%<$ZrO_2+Al_2O_3+SiO_2$, preferably 95%<$ZrO_2+Al_2O_3+SiO_2$.

11. The process as claimed in claim 1, in which the base product includes more than 80% by mass of $ZrO_2$.

12. The process as claimed in claim 1, in which the base product has a composition such that, for a total of more than 90%, as mass percentages on the basis of the oxides:
$ZrO_2$: 26 to 45%;
$Al_2O_3$: 40 to 60%;
$SiO_2$: 5 to 35%;
or such that
$ZrO_2$: 50 to less than 80%;
$Al_2O_3$: 15 to 30%;
$SiO_2$: 5 to 15%;
or such that
$ZrO_2$:≥80%;
$Al_2O_3$:≥5%;
$SiO_2$: ≤12%;
or such that
10%<$ZrO_2$≤25%;
50%<$Al_2O_3$<75%;
5%<$SiO_2$<35%.

13. The process as claimed in claim 1, wherein a cavity is present on the surface to be treated, the surface to be treated not extending continuously beyond a distance of 10 mm from the edge of said cavity, the process being applied to plug the cavity.

* * * * *